(12) United States Patent
Navrides et al.

(10) Patent No.: US 8,898,166 B1
(45) Date of Patent: Nov. 25, 2014

(54) TEMPORAL CONTENT SELECTION

(71) Applicant: Google Inc., Mountain View, CA (US)

(72) Inventors: Chris Navrides, Santa Clara, CA (US); David Li-Kuang Chen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/136,334

(22) Filed: Dec. 20, 2013

Related U.S. Application Data

(63) Continuation of application No. 13/924,759, filed on Jun. 24, 2013.

(51) Int. Cl.
*G06F 17/00* (2006.01)
*G06F 7/00* (2006.01)
*G06F 17/30* (2006.01)

(52) U.S. Cl.
CPC .............................. *G06F 17/30867* (2013.01)
USPC ........................................... 707/736; 705/342

(58) Field of Classification Search
None
See application file for complete search history.

(56) References Cited

U.S. PATENT DOCUMENTS

| 7,672,937 | B2 | 3/2010 | Madhavan et al. | |
|---|---|---|---|---|
| 8,150,841 | B2 | 4/2012 | Meyers et al. | |
| 2005/0165819 | A1* | 7/2005 | Kudoh et al. | 707/101 |
| 2007/0094249 | A1* | 4/2007 | Korst et al. | 707/5 |
| 2007/0192792 | A1* | 8/2007 | Nagamatsu | 725/39 |
| 2007/0208684 | A1* | 9/2007 | Isozaki et al. | 707/1 |
| 2009/0089169 | A1 | 4/2009 | Gupta et al. | |
| 2010/0257141 | A1* | 10/2010 | Monet et al. | 707/665 |
| 2010/0262454 | A1* | 10/2010 | Sommer et al. | 705/10 |
| 2010/0299350 | A1 | 11/2010 | Konig et al. | |
| 2011/0131243 | A1* | 6/2011 | Aben et al. | 707/771 |
| 2011/0276577 | A1* | 11/2011 | Yao et al. | 707/749 |
| 2012/0078907 | A1* | 3/2012 | Kokubu et al. | 707/737 |
| 2012/0130805 | A1* | 5/2012 | On et al. | 705/14.49 |
| 2012/0197936 | A1* | 8/2012 | Fuchs | 707/771 |
| 2012/0215777 | A1* | 8/2012 | Malik et al. | 707/737 |
| 2012/0259855 | A1* | 10/2012 | Mizuguchi et al. | 707/739 |

OTHER PUBLICATIONS

"Fokas: Formerly known as a search engine incorporation named entity evolution", Helge et al, Nov. 5, 2012.*

* cited by examiner

*Primary Examiner* — Tarek Chbouki
(74) *Attorney, Agent, or Firm* — Foley and Lardner LLP; John D. Lanza

(57) ABSTRACT

Systems and methods of the present disclosure relate generally to facilitating temporal content selection. In one implementation, the system parses a first plurality of online documents to generate a first data structure comprising historical keyword co-occurrences. The system can generate, via parsing a second plurality of online documents different from the first plurality of online documents, a second data structure comprising keyword co-occurrences not in the first data structure. The system can temporally link a first keyword of the second data structure with a second keyword of the second data structure. The second keyword may co-occur with the first keyword on a subset of the second plurality of online documents. The system can the temporally linked second keyword to a content selection server.

20 Claims, 4 Drawing Sheets

TEMPORAL CONTENT SELECTION

CROSS-REFERENCE TO RELATED APPLICATIONS

This application claims the benefit of priority under 35 U.S.C. §120 as a continuation of U.S. patent application Ser. No. 13/924,759, filed Jun. 24, 2013, which is incorporated by reference herein in its entirety.

BACKGROUND

In a networked environment such as the internet, web publishers such as people or companies can provide information for display on web pages or other documents. The web pages can include text, video, or audio information provided by the entities via a web page server for display on the internet. Content providers, such as third party advertisers, can provide additional content for display on the web pages together with the information provided by the web publishers. A content selection server may select certain additional content to display on a rendering of a web page based on various factors including, e.g., content selection criteria associated with the content to be displayed. Thus, a person viewing a web page can access the information that is the subject of the web page, as well as selected third party content that may appear with the web page.

SUMMARY

Systems and methods of the present disclosure relate generally to facilitating online content selection by contextually linking online content (e.g., online document, text, images, multimedia, advertisements, etc.) to its temporal meaning. Online content may include or be associated with content selection criteria (e.g., keywords or entities) used by a server, such as a content selection server, to facilitate content selection. In some implementations of the present disclosure, a system (e.g., a system or a tool including at least one processor executing on a server) can identify a temporal meaning of the content selection criteria different from an historical meaning of the content selection criteria when a news event, political event, or any other current event provides such meaning. Upon identifying the temporal meaning of the content selection criteria, the system can generate a temporal-based contextual link between the original content selection criteria associated with the content and a new keyword or term that represents the temporal meaning. The temporal-based contextual link may indicate that the two terms are associated with each other for a short period of time during which the link is relevant, but that the two terms may not otherwise be related to each other.

At least one aspect is directed to a method for temporal based content selection via a computer network. In some implementations, the method includes parsing a first plurality of online documents to generate a first data structure comprising historical keyword co-occurrences. In some implementation, at least one processor or an aggregator executing on a server parses the first plurality of online documents. The method may include generating a second data structure comprising keyword co-occurrences not in the first data structure. The at least one processor or online site aggregator parses a second plurality of online documents different from the first plurality of online documents to generate the second data structure. The method may include temporally linking a first keyword of the second data structure with a second keyword of the second data structure. The second keyword may co-occur with the first keyword on a subset of the second plurality of online documents. In some implementation, at least one processor or a keyword linker executing on the server may temporally link the first keyword with the second keyword. The method may include identifying the temporally linked second keyword responsive to receiving a content selection query comprising the first keyword. In some implementation, at least one processor or a keyword lookup module executing on the server identifies the temporally linked second keyword. The method may include transmitting the temporally linked second keyword to a server, such as a content selection server. In one implementation, a communication interface of the server transmits the temporally linked second keyword.

In one implementation, the method includes the at least one processor or online site aggregator parsing at least one of an online encyclopedia and an online dictionary.

In one implementation, the method includes the at least one processor or online site aggregator identifying a third plurality of online documents via an online news stream. Each of the third plurality of online documents can include a publish time stamp. The at least one processor or online site aggregator can compare the publish time stamp of each of the third plurality of online documents with a temporal threshold to identify the second plurality of online documents.

In one implementation, the method includes the at least one processor or keyword linker evaluates the subset of the second plurality of online documents on which the first keyword and the second keyword co-occur. The at least one processor or keyword linker can determine a characteristic of the co-occurrence of the first keyword and the second keyword based on the evaluation. The at least one processor or keyword linker can temporally link the first keyword with the second keyword responsive to the characteristic satisfying a predetermined threshold for the characteristic.

In one implementation, the method includes the at least one processor or keyword linker determining a frequency of co-occurrence of the first keyword and the second keyword based on the subset of the second plurality of online documents on which the first keyword and the second keyword co-occur. The at least one processor or keyword linker can temporally link the first keyword with the second keyword responsive to the frequency of occurrence exceeding a frequency of occurrence threshold.

In one implementation, the method can include the at least one processor or keyword linker assigning an attribute to the temporal link. In one implementation, the method can include the at least one processor or keyword linker evaluating at least one of the publish time stamp of the subset of the second plurality of online documents and a frequency of co-occurrence of the first keyword and the second keyword to generate an attribute of the temporal link. The at least one processor or keyword linker can then assigning the attribute to the temporal link.

In one implementation, the method includes at least one processor or the keyword linker evaluating the subset of the plurality of online documents to determine a duration attribute for the temporal link. The at least one processor or keyword linker can then assign the duration attribute to the temporal link.

In one implementation, the method includes the at least one processor or keyword linker removing the temporal link responsive to the duration of the temporal link exceeding the assigned duration attribute.

In one implementation, the server can receive an indication from a content provider to select content of the content provider based on temporal links.

At least one aspect is directed to a system for temporal based content selection via a computer network. In one implementation, the system can include an online site aggregator executing on a server. The online site aggregator can parse a first plurality of online documents to generate a first data structure comprising historical keyword co-occurrences. The online site aggregator can also parse a second plurality of online documents different from the first plurality of online documents to generate a second data structure comprising keyword co-occurrences not in the first data structure. The system can include a keyword linker executing on the server. The keyword linker can temporally link a first keyword of the second data structure with a second keyword of the second data structure. The second keyword can co-occur with the first keyword on a subset of the second plurality of online documents. The system can include a keyword lookup module executing on the server. The keyword lookup module can identify the temporally linked second keyword responsive to receiving a content selection query comprising the first keyword. The system can include a communication interface. The communication interface can transmit the temporally linked second keyword to a server such as a content selection server.

At least one aspect is directed to a non-transitory computer readable storage medium having instructions for temporal based content selection via a computer network. In some implementations, the instructions can include instructions parse a first plurality of online documents to generate a first data structure comprising historical keyword co-occurrences. The instructions can include instructions to parse a second plurality of online documents different from the first plurality of online documents to generate a second data structure comprising keyword co-occurrences not in the first data structure. The instructions can include instructions to temporally link a first keyword of the second data structure with a second keyword of the second data structure. The second keyword can co-occur with the first keyword on a subset of the second plurality of online documents. The instructions can include instructions to identify the temporally linked second keyword responsive to receiving a content selection query comprising the first keyword. The instructions can include instructions to transmit the temporally linked second keyword to a content selection server.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
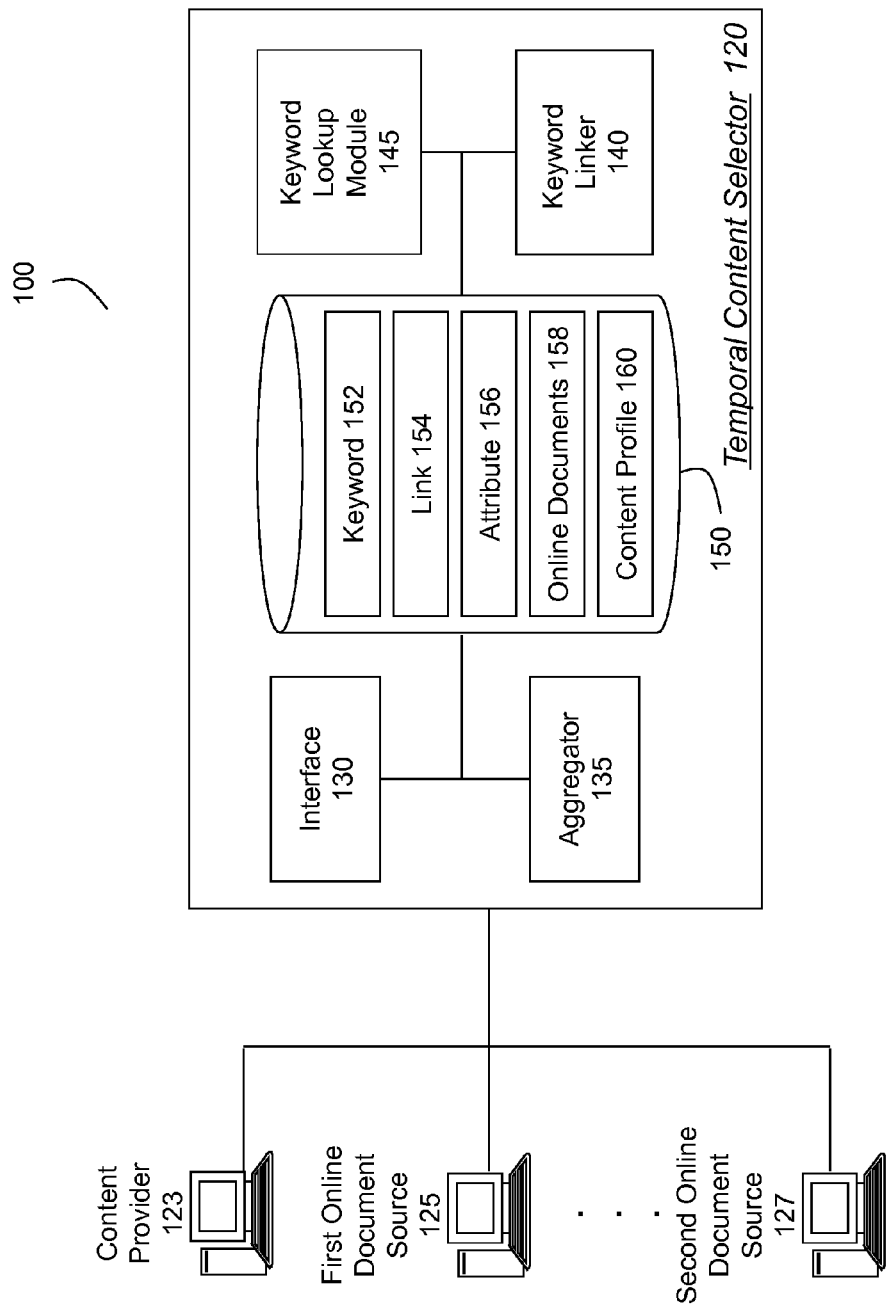
FIG. 1 is a block diagram depicting one implementation of a system for temporal content selection via a computer network in accordance with an implementation.

Systems and methods of the present disclosure relate generally to facilitating temporal content selection via a computer network. As social contexts continually change based upon current events, systems and methods of the present disclosure can contextually link online content (e.g., text, images, audio, video, multimedia, documents, advertisements, etc.) to their temporal meaning (e.g., a topic, person, place, or entity that is not normally associated with the content, except for a short period of time while they are relevant). In one implementation, the system can automatically scan recent news articles, news feeds, or social media web sites to find similar keywords and associate them together.

An illustrative implementation of a temporal meaning of a term based on a changing social context caused by a current event includes a politician discussing funding for an educational project during a televised appearance. The politician may not have been associated or linked with this education project prior to the televised appearance. However, upon making these comments, people may publish news articles, text via social media, or other online documents describing the politician's comments about the educational project, thereby associating the politician with the educational project. In some implementations, the system (e.g., via a tool or at least one processor executing on a server) can scan recent online documents to automatically determine that the politician and the educational project were not previously contextually linked, but are now contextually linked, and then generate a temporal contextual link between the politician and the educational project.

When a user enters a search query including terms for the educational project (e.g., "educational project", "funding for educational project", "budget for educational project", "educational project costs") into an online search engine, a content selection server can identify that the entered terms are associated with "educational project" and further identify that "educational project" is temporally contextual linked keyword to the politician. The content selection server can select content associated with politician rather than the educational project (e.g., select advertisements for the politician or other political candidates). The content selection server may then provide the selected advertisements for display alongside the search results.

In some implementations, a content provider may opt-in for the functionality disclosed herein so the system will only select content using a temporal link upon receiving an indication from the content provider.

In some implementations, the system obtains anonymous computer network activity information associated with a plurality of user devices. A user of a user device can affirmatively authorize the system to obtain network activity information corresponding to the user's user device. For example, the system can prompt the user of the user device for consent to obtain one or more types of network activity information. The identity of the user of the user device can remain anonymous and the user device may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In one implementation, the system parses an online document to identify a keyword, entity or concept of the online document. The keyword, entity or concept may be present in the body of the online document, metadata, title, headers or embedded objects. The system may further examine the online document to identify one or more concepts associated with the online document (e.g., performing semantic analysis techniques on the text or keywords of the document to identify topics or concepts).

Upon identifying a plurality of keywords, concepts or entities of the online document, the system can correlate the co-occurrences of the keywords, concepts or entities to determine whether the co-occurrence is a familiar co-occurrence (e.g., based on previous analysis of co-occurrences or a data structure comprising historical co-occurrences). If the system determines that it is not a familiar co-occurrence, the system can add the co-occurrence to a data structure comprising newly identified co-occurrences. In some implementations, the system may only add the co-occurrence if a term of the co-occurrence satisfies a performance metric (e.g., the keyword, entity or concept is associated with one of the top 1000 search queries in a search engine, or a high click through or conversion rate).

The system can continue to parse online documents to identify a second, third, fourth, etc. online documents that contain the same new keyword co-occurrence. If a plurality of online documents contain the new co-occurrence, the system may determine that the new co-occurrence is credible and generate a temporal link between the keywords, concepts or entities of the new co-occurrence. The temporal link may exist for a duration of time, or for as long as a frequency of the co-occurrence in new documents satisfies a threshold (e.g., five new co-occurrences per 12 hours).

FIG. 1 is an illustration of one implementation of a system 100 for temporal content selection via a computer network in accordance with an implementation. The system 100 may include a temporal content selector 120, which may include one or more processor executing on a server. In brief overview, the system 100 or temporal content selector 120 may include one or more interface 130, aggregator 135, keyword linker 140, keyword lookup module 145 or database 150 that are designed and constructed to contextually link keywords to their temporal meaning to facilitate content selection via a computer network. Each element or module of the system 100, such as the interface 130, aggregator 135, keyword linker 140 or keyword lookup module 145, can include at least one processing unit or other logic device such as programmable logic array engine, or module configured to communicate with the database 150. The interface 130, aggregator 135, keyword linker 140 and keyword lookup module 145 can be separate components, a single component, or part of the system 100 or temporal content selector 120. The system 100 can include at least one logic device such as a computing device having a processor to communicate via a network 302, for example with a client device 305 or at least one content provider 127, first online document provider 125 and second online document provider 127. The content provider 127 may provide content such as text, images, audio, video, multimedia, documents or advertisements. The first online document source 125 can include sources of historical information such as an online encyclopedia, biography, dictionary, or other information that includes keywords or terms that are normally associated with each other. The second online document source 127 can include current event sources such as online news web sites, news feeds, online social media documents or other sources that can indicate a changing social context for a term or keyword. The system 100, temporal content selector 120 or tool can execute on or include at least one server 315. For example, the temporal content selector 120 can execute on at least one processor of at least one servers located in at least one data center. In some implementations, the system 120 can employ distributed computing on clusters of computers using libraries or programming for processing large data sets (e.g., MapReduce or Apache Hadoop).

Still referring to FIG. 1, and in one implementation, the temporal content selector 120 includes an interface 130 designed and constructed to receive, access or otherwise obtain data as well as output data. The interface 130 can include a communication interface that facilitates communication between any module of the temporal content selector 120. In some implementations, the interface 130 can convey information to or from content provider 123, first online document source 125, second online document source 127 or client devices 305. In some implementations, the interface 130 can communicate via an application layer protocol such as HyperText Transfer Protocol (HTTP).

In one implementation, the temporal content selector 120 includes an aggregator 135 that is designed and constructed to parse a plurality of online documents to generate a data structure comprising keyword co-occurrences. In one implementation, the aggregator 135 may include one or more of a data aggregator, search aggregator, news aggregator, or social media aggregator configured to obtain source information from online document sources 125 and 127. In one implementation, the aggregator 135 includes a web crawler that systematically browses the World Wide Web to identify web pages that can be parsed to determine keyword co-occurrences.

The aggregator 135 can parse one or more of the plurality of online documents. The aggregator 135 can parse one or more of the text of the online document, metadata, uniform resource locator, embedded content, or source code. The aggregator 135 can parse online documents periodically, continuously, upon identifying a new or updated online document, or on any other interval. The online documents may be identified using a plurality of techniques. In one implementation, the aggregator 135 may parse online documents identified via a predetermined list of uniform resource locators ("URL") or domains. In another implementation, the aggregator 135 may parse online documents that are recently published (e.g., whose publish time stamp is within a temporal threshold such as 12 hours, 24 hours, 48 hours, 72 hours, etc.). In yet another implementation, the aggregator 135 may parse online documents that have received a certain number of unique visitors. In yet another implementation, the aggregator may parse online documents that are published by a predetermined list of content publishers.

As the aggregator 135 parses a document, the aggregator 135 can identify keywords, semantic concepts or entities (e.g., person, place or thing associated with a unique classification identifier) that co-occur. A keyword may include a term, phrase, concept or entity. For example, the keyword "student loan" may co-occur with "forgiveness". In one implementation, the aggregator 135 can identify a plurality of semantic concepts or topics of an online document and determine that a first concept co-occurs with a second concept. The aggregator 135 can identify one or more concepts using one or more semantic analysis techniques such as, e.g., probabilistic semantic analysis or probabilistic latent semantic analysis.

The aggregator 135 can generate a data structure that includes some or all keyword (or concepts or entities) co-occurrences or the top ranking co-occurrences (e.g., the most popular keywords based on number of search queries, the frequency of co-occurrences, the number of online documents containing the keyword, or another metric). In one implementation, the data structure may include a row where the first column includes the keyword (or a unique identifier for the keyword, concept or entity) and each subsequent column may include keywords (or concepts or entities) that co-occur with the keyword of the first column. In one implementation, the data structure may include a hash table to implement an associative array that can map keys to values, where a keyword or keyword identifier may be used as the key and the values may include one or more co-occurring keywords. The hash table may be designed to allow arbitrary insertions and deletions of key-value pairs. In one implementation, each keyword may be represented by a pointer to the keyword or a unique identifier.

In another implementation, the data structure may include a graph database where each keyword is represented by a node that is connected, via an edge or link, to another node with associated properties. Nodes may represent keywords or entities such as a term or phrase. The edges may be the lines that connect nodes to nodes or nodes to properties. Edges may represent the relationship between two nodes (e.g., a temporal link). Information or properties can be stored in the edges. The temporal content selector 120 can evaluate the connections and interconnections of nodes, properties, and edges to facilitate temporal content selection.

In one implementation, the data structure may only include top ranking keywords, entities or concepts. Top ranking terms may include terms that appear in the top 1000 search queries or associated with high click through rates or conversion rates.

The aggregator 135 can determine that a keyword co-occurs with another keyword using a plurality of techniques. In one implementation, the aggregator 135 can determine that an online document contains both the first keyword and the second keyword and generate a data structure indicating that the first keyword co-occurs with the second keyword. In another implementation, the aggregator 135 may include the second keyword as co-occurring with the first keyword upon determining that a certain number of online documents out of a plurality of online documents contain both the first keyword and the second keyword (e.g., 5%, 10%, 25%, or another percentage that indicates that the co-occurrence is credible).

In one implementation, the aggregator 135 can store information about the co-occurrence of the first keyword and second keyword. The aggregator 135 may store (e.g., in the second data structure), information about the frequency of co-occurrence, the identity of the parsed online document containing the co-occurrence, the timestamp of the co-occurrence (e.g., the date and time the online document containing the co-occurrence was published online), a geographical location associated with the online document, the proximity or location of the first keyword to the second keyword in the online document (e.g., adjacent, same sentence, same paragraph, title, metadata, within 10, 20, or 30 words, or main domain page).

In one implementation, the aggregator 135 may generate a first data structure that includes historical keyword co-occurrences. Historical keyword co-occurrences may refer to keywords that are normally associated with each other, such as, e.g., "baseball" and "bat", "car" and "insurance", "movie" and "tickets". The aggregator 135 may generate the first data structure by parsing a first plurality of online documents such as encyclopedias, dictionaries, biographies or other sources of historical content that include standard associations as opposed to short term, current event based associations.

The aggregator 135 can generate a second data structure that includes keyword co-occurrences not in the first data structure. The second data structure may include keyword co-occurrences based on a changing social context. The aggregator 135 can identify the changing social context by parsing a second plurality of online documents such as online news feeds, online social media feeds, or other sources of current events. In one implementation, the aggregator 135 may filter a plurality of online documents based on a metric to identify the second plurality of online documents. The online aggregator 135 may filter a plurality of online documents based on a publish time stamp, source of the online document, unique views of the online document.

By identifying an increase of documents containing a first keyword and a second keyword that are not normally co-occurring in the same document (e.g., not co-occurring in the first data structure comprising historical keyword co-occurrences), the aggregator 135 may identify a potentially new social context for the first keyword.

In one implementation, the aggregator 135 parses a second plurality of documents to identify a second plurality of keyword co-occurrences, which the aggregator 135 can store in a second data structure. In one implementation, the aggregator 135 can temporarily store the second plurality of keyword co-occurrences in a data structure that will be modified prior to storing the keyword co-occurrences in the second data structure. The aggregator 135 can compare the second plurality of keyword co-occurrences with the first data structure that includes historical keyword co-occurrences to identify new keyword co-occurrences in the second plurality of keyword co-occurrences that are not included in the first historical keyword co-occurrence data structure. In one implementation, the aggregator 135 can use a deduplication technique to remove keyword co-occurrence pairs in the second data structure (or temporary data structure). In another implementation, the aggregator 135 can store only new keyword co-occurrences in the second data structure by determining, prior to storing, whether the first data structure already includes the keyword co-occurrence pair. If the first data structure already includes the keyword co-occurrence pair, the temporal content selector 120 may decide not to store the keyword co-occurrence in the second data structure because the keyword co-occurrence may not represent a changing social context for either keyword in the keyword co-occurrence pair. In yet another implementation, the temporal content selector 120 may execute an independent process that checks the first data structure and second data structure for redundant keyword co-occurrences and removes the redundancies from the second data structure.

In some implementations, the aggregator 135 may include the information related to the new keyword co-occurrences to facilitate linking keywords by, e.g., a keyword linker 140. The information can include frequency of occurrence of the co-occurrence, the proximity or location of co-occurrence, or other information obtained by the aggregator 135.

In some implementations, the aggregator 135 may create only one data structure and indicate whether keyword co-occurrences are historically co-occurring or linked temporally responsive to a changed social context.

In one implementation, the temporal content selector 120 includes a keyword linker 140 designed and constructed to generate a temporal link between a first keyword and a second keyword. The keyword linker 140 may evaluate or analyze the second data structure comprising the first keyword and second keyword to generate the link. The second data structure may already indicate that the first keyword and second keyword co-occur on at least one online document (e.g., three online news articles published in the last 12 hours), and also indicate that the first keyword and second keyword do not normally co-occur. In one implementation, the keyword linker 140 may automatically generate a temporal link between the first keyword and the second keyword based on this new co-occurrence as indicated by the second data structure.

In another implementation, the keyword linker 140 evaluates information related to the new keyword co-occurrence prior to generating the temporal link. The keyword linker 140 may evaluate information to determine the credibility of the co-occurrence prior to generating the temporal link. In one implementation, the keyword linker 140 can evaluate information associated with the subset of the second plurality of online documents on which the first keyword and the second keyword co-occur. The keyword linker 140 can determine, based on this evaluation, a characteristic associated with the co-occurrence of the first keyword and second keyword. In some implementations, the keyword linker 140 can determine one or more of a number of co-occurrences, a frequency of co-occurrence, a proximity or location of co-occurrence, whether the online documents are related or associated with each other, and a geographic characteristic associated with the co-occurrence. The keyword linker 140 may determine to generate a temporal link between the first keyword and the second keyword based on the characteristic. In some implementations, the keyword linker 140 may assign an attribute to the temporal link based on the characteristic.

In one implementation, the keyword linker 140 can determine the frequency of co-occurrence (e.g., the number of unique co-occurrences in a certain time period), compare the frequency of co-occurrence with a threshold value, and generate the temporal link responsive to the frequency of co-occurrence meeting or exceeding the threshold. In one implementation, the keyword linker 140 can determine the frequency of co-occurrence with respect to a predetermined time period. The keyword linker 140 can determine that the aggregator 135 identified, e.g., fifty new co-occurrences within the last, e.g., 12 hours, 24 hours, 48 hours or any other time period representing a recent burst in co-occurrences. The keyword linker 140 may compare the frequency of co-occurrence within the time period with a frequency of co-occurrence threshold (e.g., 5 per 12 hour period, 20 per 24 hour period, 50 per 48 hour period, or any other frequency that facilitates temporal content selection). Upon determining that the frequency of co-occurrence meets or exceeds a frequency of co-occurrence threshold, the keyword linker 140 can generate a temporal link between the first keyword and the second keyword.

In one implementation, the keyword linker 140 can determine the frequency of co-occurrence by identifying the number of online documents that contain both the first keyword and the second keyword. In one implementation, the second data structure may indicate the number of co-occurrences for the first and second keyword pair. In another implementation, the keyword linker 140 can identify the number of co-occurrences by determining the number of unique URLs or other web page identifiers associated with each keyword co-occurrence pair. The keyword linker 140 can determine that a first user of a social media platform published ten unique messages that contain the first keyword and the second keyword. The keyword linker 140 may identify this to be one occurrence of the co-occurrence of the first keyword and the second keyword because all ten messages were published by a single user. Thereafter, the keyword linker 140 may identify that a second, third and fourth user of the social media platform also published messages that contain the first keyword and second keyword.

In another implementation, the keyword linker 140 may determine that the number of co-occurrences is sufficient for the co-occurrence of the first keyword and second keyword to be credible and not merely a coincidence. The keyword linker 140 can compare the number of co-occurrences with a number of co-occurrences threshold (e.g., three, four, five, ten, twenty, or any other threshold that indicates that the keyword co-occurrence is credible and not a mere coincidence).

In one implementation, the temporal content selector 120 can employ various techniques to determine whether online documents are related to each other to facilitate identifying the number or frequency of unique, credible co-occurrences of the first and second keywords. The temporal content selector 120 may determine whether online documents are related by identifying a web domain of the online document, author of the online document, publisher of the online document, or a unique identifier for same. In some implementations, the keyword linker 140 may determine whether online documents are related based on analyzing the backlinks to the online documents (e.g., if a plurality of documents are all linked to each other, the keyword linker 140 may determine that a single entity controls all those online documents and may be responsible for the keyword co-occurrence on all those documents, and thus filter this out as a single co-occurrence).

In one implementation, the keyword linker 140 can generate a temporal link based on a geographic characteristic. The keyword linker 140 may determine that the first and second keywords co-occur on online documents related to a geographic region or area. In one implementation, the keyword linker 140 may determine that online news documents of a first region may have an increase in the co-occurrence of the first keyword and second keyword, while online news documents of a second region do not have any increase in the co-occurrence of the first keyword and the second keyword.

In one implementation, the keyword linker 140 can assign an attribute to the temporal link. The attribute can be a predetermined attribute or a dynamic attribute that is set based on a characteristics associated with the co-occurrence of the first and second keyword. Predetermined attributes may include, e.g., a duration attribute, a geographic scope attribute, a use case attribute (e.g., to only use the temporal link to select content provided by specified content providers, or when the content is for display on specified web pages).

In further detail, a duration attribute may represent the length of the time the temporal link exists. The duration may be predetermined to be a set number of hours, days, weeks or months. For example, the predetermined duration may be 24 hours, 48 hours, 72 hours, etc. In one implementation, the temporal content selector 120 can optimize the duration based on determining an optimal amount of time during which keywords have contextual temporal meaning. For example, the temporal content selector 120 may receive feedback based on a click through rate or conversion rate associated with content that is selected via the temporal link. In another implementation, the temporal content selector 120 can dynamically adjust the duration of the temporal link based on a performance metric. For example, if the click through rate or conversion rate falls below a click through rate threshold or a conversion rate threshold, then the keyword linker 140 may remove the temporal link.

In one implementation, the keyword linker 140 may dynamically adjust the duration based on a frequency of co-occurrence. For example, as the frequency of co-occurrence increases, the duration of the temporal link may increase (e.g., the duration of the temporal link may be 7 days if the if the frequency of co-occurrence was 50 within the last 24 hours). In one implementation, the duration of the temporal link may be modified or adjusted on an ongoing bases. For example, the temporal content selector 120 may determine that recently published online documents (e.g., based on a time stamp, or the aggregator 135 identifying newly published online documents) continue to include the co-occurrence of the first keyword and second keyword. The temporal content selector 120 may determine that the temporal meaning of the first keyword is still valid (e.g., the social context based on the new current event is still relevant).

In one implementation, the keyword linker 140 may assign an attribute to the temporal link based on a geographic characteristic associated with the co-occurrence. The attribute may indicate to employ the temporal link to select content for display on user devices that are in a certain geographic area, or content for display with web pages associated with the geographic area.

In one implementation, the keyword linker 140 removes the temporal link responsive to the duration of the temporal link exceeding the assigned duration attribute. In one implementation, the temporal link may be associated with a script or a counter that maintains a duration count (e.g., seconds, minutes, hours). In another implementation, the temporal content selector 120 can track the duration of each temporal link and compare the duration of the temporal link with a duration attribute or predetermined duration value. The temporal content selector 120 may automatically remove the link after a predetermined duration of time or a dynamic duration attribute.

In one implementation, the temporal content selector 120 includes a keyword lookup module 145 designed and constructed to identify keywords that are linked to each via a generated temporal link. The keyword lookup module 145 may receive an indication of a first keyword with a request for a second keyword that is temporally linked to the first keyword. The keyword lookup module 145 may return the co-occurring keywords, or a unique identifier or pointer to same.

In one implementation, the keyword lookup module 145 can parse or otherwise analyze a data structure to identify the first keyword and the second keyword. The data structure may include a row where the first column includes the keyword (or a unique identifier for the keyword) and each subsequent column may include keywords that co-occur with the keyword of the first column. In one implementation, the keyword lookup module 145 may employ a hash function or hashing technique using a hash key to identify the temporally linked second keyword. In another implementation in which the data structure includes a graph database where each keyword is represented by a node that is connected to another node, the keyword lookup module 145 may examine the graph database to obtain the keyword co-occurrences. In one implementation, each keyword may be represented by a pointer to the keyword or a unique identifier.

In one implementation, the temporal content selector 120 may include a database 150 designed and constructed to convey information to or from one or more module or element of the temporal content selector 120 or a resource accessible via network 302. In some implementations, the database 150 can include a plurality of databases or data structures including, e.g., keywords 152, historical links and temporal links 154, predetermined or dynamic attributes 156 associated with links, online documents or identifiers for online documents 158, and content provider profiles 160. In some implementations, each data structure may include a unique identifier that links the data structure or element with a corresponding data structure. In some implementations, a single data structure may include keywords 152, links 154 and attributes 156. The content provider profile 160 may include information about the content that is to be selected and provided for display with a rendering of a web page on a user device 305. The content provider profile 160 may include information such as content or content identifiers, content selection criteria (e.g., keywords or entities), and configuration parameters for content selection and or display. In one implementation, the configuration parameter may include a parameter that indicates whether to use temporal links to facilitate content selection. In another implementation, the configuration parameter may indicate whether to use one or more attributes of temporal content selection (e.g., geographic temporal content selection, duration of temporal links to use, etc.). In some implementations, the database 150 may temporarily store information to facilitate the processing of one or more element or module of the temporal content selector 120.

In one implementation, the temporal content selector 120 may receive an indication from a content provider (e.g., via a configuration parameter associated with the provided content, content group, or content campaign) to use temporal links to facilitate content selection. Upon receiving an indication for content associated with a first keyword, the temporal content selector 120 may identify a first content provider whose content is relevant to the first keyword, and further identify second content providers whose content is temporally relevant to the first keyword based on a temporal link between the first keyword and a second keyword, the second keyword being associated with the content of the second content provider.

In one implementation, the temporal content selector 120 may provide a user interface to a content provider 123 or other user that displays data associated with the temporal content selector. The temporal content selector 120 can provide information on temporal links associated with content of a content provider. The content provider 123 or user may indicate to the temporal content selector 120 to add one or more temporally linked keywords to content selection criteria associated with the content or content group (e.g., a plurality of creatives or content that include URLs to the same web page or domain). Upon receiving an indication to add one or more temporally linked keywords as content selection criteria, the temporal content selector 120 can update the profile or data structure comprising content selection criteria for the content provider. In one implementation, the temporal content selector 120 may automatically remove the temporally linked content selection criteria upon the temporal link expiring per a duration attribute of the temporal link.

Figure 2:
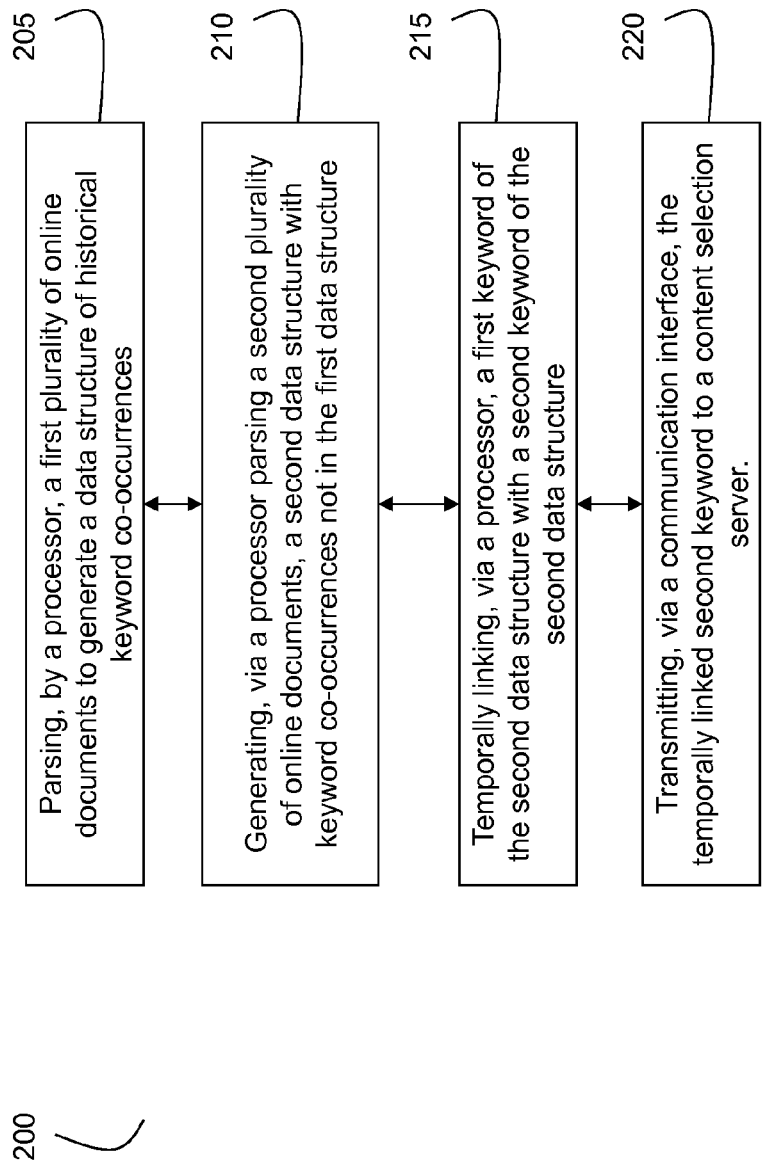
FIG. 2 is a flow chart depicting the steps taken in one implementation of a method for temporal content selection via a computer network in accordance with an implementation.

FIG. 2 is a flow chart depicting the steps taken in one implementation of a method 200 for temporal content selection via a computer network. In brief overview, and in one implementation, method 200 includes a temporal content selector or at least one processor executing on a server parsing a first plurality of online documents to generate a data structure of historical keyword co-occurrences (205). The method can include the processor generating a second data structure with keyword co-occurrences not in the first data structure (210). The method can include the processor temporally linking a first keyword of the second data structure with a second keyword of the second data structure (215). The method can include the processor transmitting the temporally linked second keyword to a content selection server (220).

In some implementations, the method 200 includes parsing a first plurality of online documents to generate a first data structure that includes historical keyword co-occurrences. In some implementations, a processor or an online site aggregator of a temporal content selector executing on a server can parse the plurality of online documents. In one implementation, the method includes identifying the plurality of online documents to parse. The processor may obtain a predetermined list of online documents to parse (e.g., online encyclopedias, dictionaries, or biographies). In one implementation, the processor identifies a plurality of online documents to parse via a web crawler.

In one implementation, the temporal content selector or a processor executing on a server generates the historical keyword co-occurrence data structure by continuously parsing a plurality of online documents for an extended period of time. The processor can identify keywords, entities or semantic concepts that repeatedly co-occur in these documents over an extended period of time. The extended period of time can represent a duration that is longer than a short burst that indicates a temporal co-occurrence based on a current event. Thus, keywords, entities or concepts that co-occur for an extended period of time can represent a normal co-occurrence (e.g., "dogs" and "pet food" or "movies" and "tickets"), while co-occurrences that disappear after a short period of time may represent a temporal meaning (e.g., a political candidate and an education television show).

In one implementation, the method 200 can include at least one processor or a temporal content selector executing on a server generating a second data structure comprising keyword co-occurrences not in the first data structure (210). The keyword co-occurrences in the second data structure may represent short term correlations between keywords, entities or concepts. The co-occurrences in the second data structure may not exist in the first data structure because the first data structure may include only those co-occurrences that are normal or between concepts that are historically correlated.

In one implementation, at least one processor or a temporal content selector executing on a server parses a second plurality of documents different from the first plurality of documents to generate the second data structure. The second plurality of documents may include recently published online documents (e.g., online news articles, social media messages, or recently published blogs). The processor can determine that the documents were recently published based on a time stamp or other indicator of when the online document was published online.

In one implementation, the method 200 includes at least one processor or a temporal content selector executing on a server temporally linking a first keyword of the second data structure with a second keyword of the second data structure (215). The processor may determine that the first keyword and the second keyword co-occur on a subset of the second plurality of online documents. In one implementation, the processor may further evaluate information about the co-occurrence prior to generating the temporal link to determine whether the first keyword and the second keyword are actually correlated.

In some implementations, prior to generating the temporal link between keywords (or concepts or entities), the at least one processor or temporal content selector executing on a server can determine various characteristics associated with the co-occurrence and determine whether the characteristic satisfies a predetermined threshold. The characteristics may facilitate determining whether the co-occurrence indicates a correlation between the two keywords, or if the co-occurrence is merely a coincidence. For example, if a plurality of online documents contain the co-occurrence, then there may be an actual correlation. The processor may further identify whether the online documents are unique and not related (e.g., a plurality of online documents of a specific web domain containing the co-occurrence may be determined to be a single co-occurrence rather than a plurality of co-occurrences).

In one implementation, the processor generates the temporal link between the first keyword and second keyword (or first and second concepts) upon determining that a certain number of online documents contain both the first and second keywords. In one implementation, the processor determines a frequency of occurrence by determining the number of online documents that contain the co-occurrence that were published online in the last 12 hours, 24 hours, 48 hours or another time interval.

In some implementations, the at least one processor or a temporal content selector executing on a server assigns an attribute to the temporal link. The attribute may include a predetermined attribute such as a duration for the temporal link, which may indicate when the processor should remove the temporal link. In other implementations, the attribute may include a dynamic attribute that can be set based on a characteristic. For example, if the frequency of occurrence is greater than a threshold value, the duration attribute may include a longer duration. If the frequency of occurrence is below a threshold value, the duration attribute may include a shorter duration. In one implementation, if the frequency of co-occurrence is greater than three and less than ten unique co-occurrences in 12 hours, then the duration for the temporal link may be 48 hours. In another implementation, if the frequency of co-occurrence is greater than ten unique co-occurrences in 12 hours, then the duration for the temporal link may be 72 hours.

In one implementation, the method 200 includes at least one processor or a temporal content selector executing on a server transmitting the temporally linked second keyword to a content selection server. The processor can transmit the temporally linked second keyword via a communication interface of the temporal content selector executing on the server. In one implementation, the processor can transmit the temporally linked second keyword responsive to a request for content selection criteria associated with the first keyword. In some implementations, the temporal content selector can transmit additional information along with the second keyword including, e.g., a corresponding concept or entity.

Figure 4:
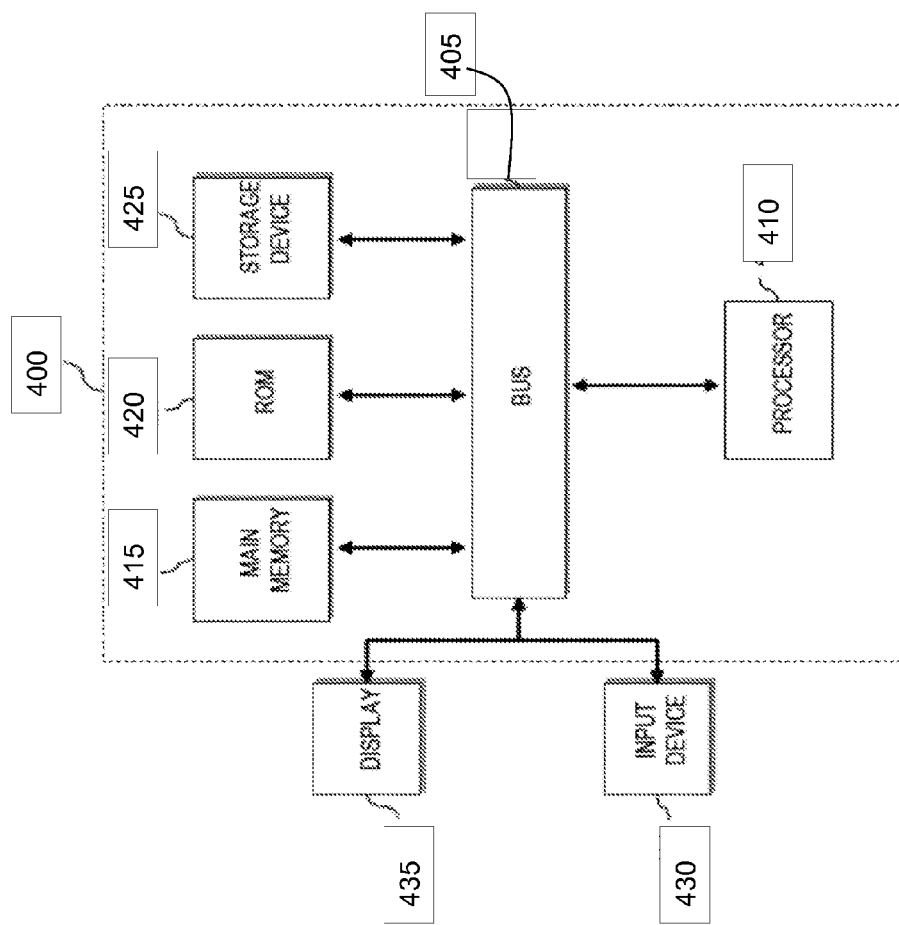
FIG. 4 is a block diagram depicting one implementation of a general architecture for a computer system that may be employed to implement various elements of the system shown in FIG. 1 and the method shown in FIG. 2, in accordance with an implementation.

The temporal content selector 120 and its components, such as interface 130, aggregator 135, keyword linker 140, or keyword lookup module 145, may include hardware elements, such as one or more processors, logic devices, or circuits. FIG. 4 depicts an implementation of a network environment 300. The system 100 and method 400 can operate in the network environment 300 depicted in FIG. 4. In brief overview, the network environment 300 includes one or more clients 305 that can be referred to as local machine(s) 305, client(s) 305, client node(s) 305, client machine(s) 305, client computer(s) 305, client device(s) 305, endpoint(s) 305, or endpoint node(s) 305) in communication with one or more servers 315 that can be referred to as server(s) 315, node 315, or remote machine(s) 315) via one or more networks 302. In some implementations, a client 305 has the capacity to function as both a client node seeking access to resources provided by a server and as a server providing access to hosted resources for other clients 305.

The network 302 can be used to access information resources such as web pages, web sites, domain names, or uniform resource locators that can be displayed on at least one user device 305, such as a laptop, desktop, tablet, personal digital assistant, smart phone, or portable computers. For example, via the network 302 a user of the user device 305 can access web pages provided by at least one web site operator 305 or 315. In this implementation, a web browser of the user device 305 can access a web server of the web site operator 315 to retrieve a web page for display on a monitor of the user device 305. The web site operator 315 generally includes a person or company that operates the web page. In one implementation, the web site operator 315 includes at least one web page server that communicates with the network 302 to make the web page available to the user device 305.

Figure 3:
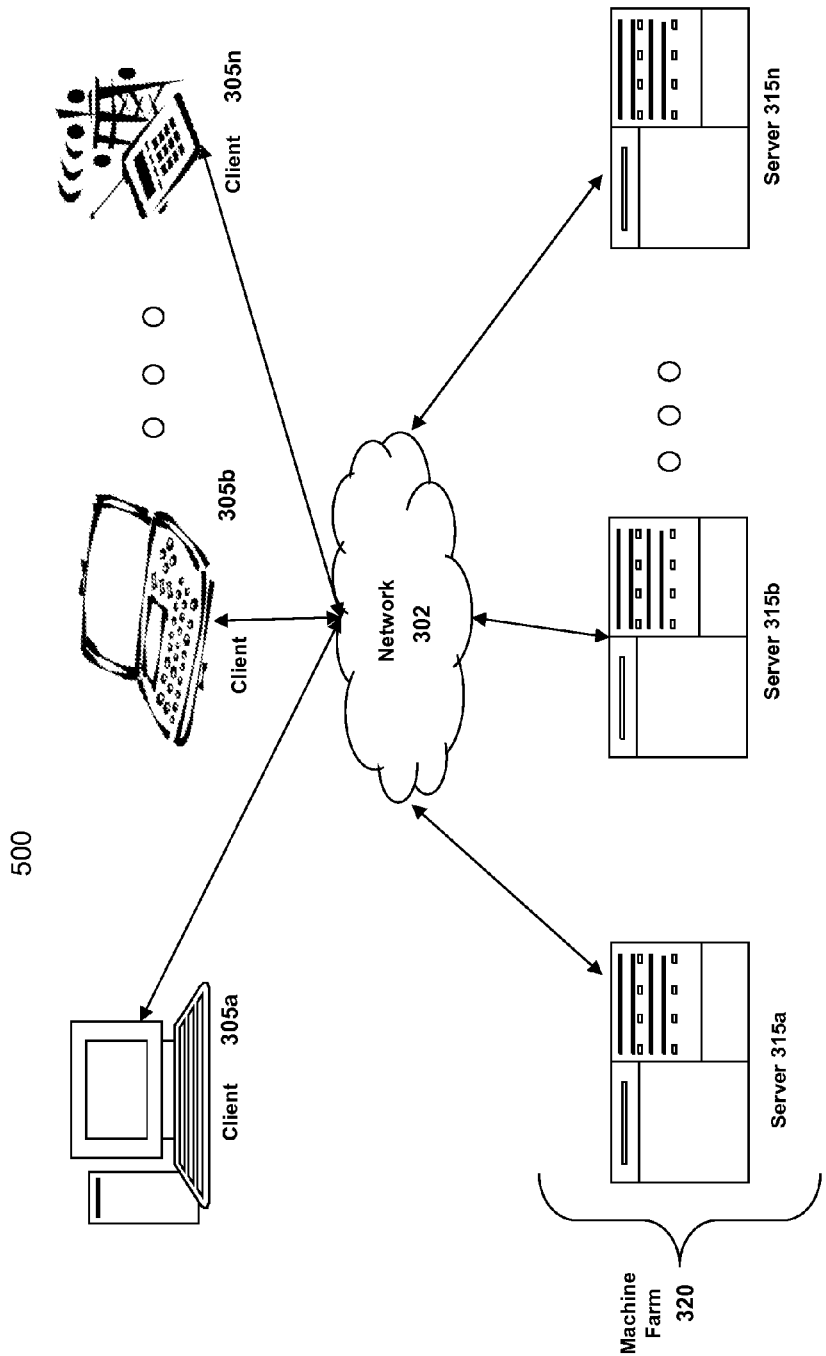
FIG. 3 is a block diagram depicting one implementation of a network environment comprising client machines in communication with remote machines in accordance with an implementation.

Although FIG. 3 shows a network 302 between the clients 305 and the servers 315, the clients 305 and the servers 315 may be on the same network 302. The network 302 can be a local-area network (LAN), such as a company Intranet, a metropolitan area network (MAN), or a wide area network (WAN), such as the Internet or the World Wide Web. In some implementations, there are multiple networks 302 between the clients 302 and the servers 315. In one of these implementations, the network 302 may be a public network, a private network, or may include combinations of public and private networks.

The network 302 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 302 may include a wireless link, such as an infrared channel or satellite band. The topology of the network 302 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 315. In one of these implementations, the logical group of servers may be referred to as a server farm 320 or a machine farm 320. In another of these implementations, the servers 315 may be geographically dispersed. In other implementations, a machine farm 320 may be administered as a single entity. In still other implementations, the machine farm 320 includes a plurality of machine farms 320. The servers 315 within each machine farm 320 can be heterogeneous—one or more of the servers 315 or machines 315 can operate according to one type of operating system platform.

In one implementation, servers 315 in the machine farm 320 may be stored in high-density rack systems, along with associated storage systems, and located in an enterprise data center. In this implementation, consolidating the servers 315 in this way may improve system manageability, data security, the physical security of the system, and system performance by locating servers 315 and high performance storage systems on localized high performance networks. Centralizing the servers 315 and storage systems and coupling them with advanced system management tools allows more efficient use of server resources.

The servers 315 of each machine farm 320 do not need to be physically proximate to another server 315 in the same machine farm 320. Thus, the group of servers 315 logically grouped as a machine farm 320 may be interconnected using a wide-area network (WAN) connection or a metropolitan-area network (MAN) connection. For example, a machine farm 320 may include servers 315 physically located in different continents or different regions of a continent, country, state, city, campus, or room. Data transmission speeds between servers 315 in the machine farm 320 can be increased if the servers 315 are connected using a local-area network (LAN) connection or some form of direct connection. Additionally, a heterogeneous machine farm 320 may include one or more servers 315 operating according to a type of operating system, while one or more other servers 315 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 320 may be de-centralized. For example, one or more servers 315 may comprise components, subsystems and circuits to support one or more management services for the machine farm 320. In one of these implementations, one or more servers 315 provide functionality for management of dynamic data, including techniques for handling failover, data replication, and increasing the robustness of the machine farm 320. Each server 315 may communicate with a persistent store and, in some implementations, with a dynamic store.

Server 315 may include a file server, application server, web server, proxy server, appliance, network appliance, gateway, gateway, gateway server, virtualization server, deployment server, secure sockets layer virtual private network ("SSL VPN") server, or firewall. In one implementation, the server 315 may be referred to as a remote machine or a node.

The client 305 and server 315 may be deployed as or executed on any type and form of computing device, such as a computer, network device or appliance capable of communicating on any type and form of network and performing the operations described herein.

In some implementations, a server 315 includes a content selection server that receives a request for content. The content may include, e.g., text, characters, symbols, images, video, audio, or multimedia content. For example, the request for content may include a request for an online advertisement, article, promotion, coupon, or product description. The server 315 may receive the request from a computing device such as, e.g., user device 305. In some implementations, the server 315 receives the request via an application executing on the user device 305. For example, a mobile application executing on a mobile device (e.g., smart phone or tablet) may make a request for content. In another example, a web page may request content from the server 315 responsive to a user of a mobile device 305 visiting the web page (e.g., via a mobile device 305).

In some implementations, the request for content includes information that can facilitate content selection. In some implementations, the server 315 may request information from the user device 305 to facilitate identifying content or content selection. The server 315 may request or obtain information responsive to receiving a request for content from the user device 305. The information may include information about displaying the content on the user device 305 (e.g., a content slot size or position) or available resources of user device 305 to display or otherwise manipulate the content.

FIG. 4 is a block diagram of a computer system 400 in accordance with an illustrative implementation. The computer system or computing device 400 can be used to implement the temporal content selector 120, content provider 123, first online document source 125, second online document source 127, user device 305, server 315, interface 130, aggregator 135, keyword linker 140, keyword lookup module 145 and database 145. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although one implementation of a computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "computing device" or "data processing apparatus" can include or communicate with various apparatuses, devices, and machines for processing data, including a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of temporal content selection via a computer network, comprising:

receiving, by one or more processors, responsive to a search query input into a search engine, a request for a content item to be displayed alongside search results, the request associated with a first keyword corresponding to the search query;

parsing, by the one or more processors, a data structure storing historically linked keywords to select a second keyword linked to the first keyword via a historical link, the historical link generated based on a frequency of co-occurrence of the first keyword and the second keyword in historical content;

selecting, by the one or more processors, based on the second keyword, a first content item for display alongside the first search results;

receiving, by the one or more processors, a second request for a content item to be displayed alongside second search results, the second request associated with the first keyword;

parsing, by the one or more processors, a second data structure storing temporally linked keywords to select a third keyword temporally linked to the first keyword in the second data structure based on a frequency of co-occurrence of the first keyword and the third keyword in online documents published within a temporal threshold satisfying a frequency of co-occurrence threshold, wherein the temporal link between the first keyword and the third keyword is based on comparing the frequency of co-occurrence of the first keyword and the third keyword in the online documents with a historical frequency of co-occurrence of the first keyword and the third keyword;

identifying, by the one or more processors, a plurality of content items matching the third keyword;

determining, by the one or more processors, that a content provider of a second content item of the plurality of content items provided an indication to use temporal links for content selection; and selecting, by the one or more processors based on the indication, the second content item as a candidate for display alongside the second search results.

2. The method of claim 1, further comprising:

determining, via the second data structure, an attribute of the temporal link between the first keyword and the third keyword, the attribute comprising at least one of a duration attribute, a geographic scope attribute, and a use case attribute.

3. The method of claim 1, further comprising:
determining, via the second data structure, a duration attribute of the temporal link between the first keyword and the third keyword; and
removing the temporal link responsive to a length of time of the temporal link exceeding the duration attribute.

4. The method of claim 3, further comprising:
dynamically adjusting the duration attribute based on a frequency of co-occurrence of the first keyword and the third keyword within a time interval.

5. The method of claim 1, further comprising:
identifying, via the second data structure, a geographic scope attribute of the temporal link;
determining, by the one or more processors, that a geographic location associated with the request corresponds to the geographic scope attribute; and
selecting at least one content item of the plurality of content items corresponding to the geographic scope attribute.

6. The method of claim 1, further comprising:
identifying, via the second data structure, a use case attribute of the temporal link;
determining that the second request satisfies the use case attribute of the temporal link; and
responsive to the determination, providing at least one content item of the plurality of content items as candidates for display alongside the second search results.

7. The method of claim 1, further comprising:
generating, by the one or more processors, the temporal link between the first keyword and the third keyword based on comparing the frequency of co-occurrence of the first keyword and the third keyword on the online documents with the historical frequency of co-occurrence.

8. The method of claim 7, further comprising:
generating the temporal link responsive to determining that the frequency of co-occurrence satisfies a threshold.

9. A system for temporal content selection via a computer network, comprising:
an interface executing on one or more processors configured to receive, responsive to a search query input into a search engine, a request for a content item to be displayed alongside search results, the request associated with a first keyword corresponding to the search query;
a keyword lookup module executing on the one or more processors configured to parse a data structure storing historically linked keywords to select a second keyword linked to the first keyword via a historical link, the historical link generated based on a frequency of co-occurrence of the first keyword and the second keyword in historical content;
a content selector executing on the one or more processors configured to select a first content item for display alongside the first search results based on the second keyword;
the interface module configured to receive a second request for a content item to be displayed alongside second search results, the second request associated with the first keyword;
the keyword lookup module further configured to parse a second data structure storing temporally linked keywords to select a third keyword temporally linked to the first keyword in the second data structure based on a frequency of co-occurrence of the first keyword and the third keyword in online documents published within a temporal threshold satisfying a frequency of co-occurrence threshold, wherein the temporal link between the first keyword and the third keyword is based on comparing the frequency of co-occurrence of the first keyword and the third keyword in the online documents with a historical frequency of co-occurrence of the first keyword and the third keyword;
the content selector configured to identify a plurality of content items matching the third keyword, determine that a content provider of a second content item of the plurality of content items provided an indication to use temporal links for content selection, and select, based on the indication, the second content item as a candidate for display alongside the second search results.

10. The system of claim 9, wherein the keyword lookup module is further configured to:
determine, via the second data structure, an attribute of the temporal link between the first keyword and the third keyword, the attribute comprising at least one of a duration attribute, a geographic scope attribute, and a use case attribute.

11. The system of claim 9, further comprising:
a keyword linker configured to determine, via the second data structure, a duration attribute of the temporal link between the first keyword and the third keyword, and remove the temporal link responsive to a length of time of the temporal link exceeding the duration attribute.

12. The system of claim 9, wherein the keyword linker is further configured to:
dynamically adjust the duration attribute based on a frequency of co-occurrence of the first keyword and the third keyword within a time interval.

13. The system of claim 9, wherein:
the keyword lookup module is further configured to identify, via the second data structure, a geographic scope attribute of the temporal link; and
the content selector is further configured to determine that a geographic location associated with the second request corresponds to the geographic scope attribute, and select at least one content item of the plurality of content items corresponding to the geographic scope attribute.

14. The system of claim 9, wherein:
the keyword lookup module is further configured to identify, via the second data structure, a use case attribute of the temporal link and determine that the second request satisfies the use case attribute of the temporal link; and
the content selector is further configured to provide, responsive to the determination, at least one content item of the plurality of content items as the candidate for display alongside the second search results.

15. The system of claim 9, further comprising:
a keyword linker configured to generate the temporal link between the first keyword and the third keyword based on comparing the frequency of co-occurrence of the first keyword and the third keyword on the online documents with the historical frequency of co-occurrence.

16. The system of claim 15, wherein the keyword linker is further configured to:
generate the temporal link responsive to determining that the frequency of co-occurrence satisfies a threshold.

17. A non-transitory computer-readable storage device comprising processor executable instructions for temporal content selection via a computer network, the instructions comprising instructions to:
receive, responsive to a search query input into a search engine, a request for a content item to be displayed alongside search results, the request associated with a first keyword corresponding to the search query;

parse a data structure storing historically linked keywords to select a second keyword linked to the first keyword via a historical link, the historical link generated based on a frequency of co-occurrence of the first keyword and the second keyword in historical content;

select a first content item for display alongside the first search results based on the second keyword;

receive a second request for a content item to be displayed alongside second search results, the second request associated with the first keyword;

parse a second data structure storing temporally linked keywords to select a third keyword temporally linked to the first keyword in the second data structure based on a frequency of co-occurrence of the first keyword and the third keyword in online documents published within a temporal threshold satisfying a frequency of co-occurrence threshold, wherein the temporal link between the first keyword and the third keyword is based on comparing the frequency of co-occurrence of the first keyword and the third keyword in the online documents with a historical frequency of co-occurrence of the first keyword and the third keyword;

identify a plurality of content items matching the third keyword;

determine that a content provider of a second content item of the plurality of content items provided an indication to use temporal links for content selection; and select, based on the indication, the second content item as a candidate for display alongside the second search results.

18. The non-transitory computer-readable storage device of claim 17, wherein the instructions further comprising instructions to:

determine, via the second data structure, an attribute of the temporal link between the first keyword and the third keyword, the attribute comprising at least one of a duration attribute, a geographic scope attribute, and a use case attribute.

19. The non-transitory computer-readable storage device of claim 17, wherein the instructions further comprising instructions to:

determine, via the second data structure, a duration attribute of the temporal link between the first keyword and the third keyword; and remove the temporal link responsive to a length of time of the temporal link exceeding the duration attribute.

20. The non-transitory computer-readable storage device of claim 19, wherein the instructions further comprising instructions to:

dynamically adjust the duration attribute based on the frequency of co-occurrence of the first keyword and the third keyword within a time interval.

* * * * *